United States Patent [19]
Anderson et al.

[11] 3,866,705
[45] Feb. 18, 1975

[54] ADJUSTABLE RATIO STEERING CONTROL FOR ARTICULATED VEHICLE
[75] Inventors: Charles M. Anderson, Aylmer, Ontario, Canada; Charles R. Sturtz, Jr., Romulus, Mich.
[73] Assignee: Clark Equipment Company, Buchanan, Mich.
[22] Filed: Oct. 17, 1973
[21] Appl. No.: 407,406

[52] U.S. Cl............................................. 180/79.2 B
[51] Int. Cl............................................. B62d 13/00
[58] Field of Search ................... 180/79.2 B, 79.2 R

[56] References Cited
UNITED STATES PATENTS
3,312,301   4/1967   Hagen ............................ 180/79.2 B
3,672,460   6/1972   Takata ........................... 180/79.2 B Primary Examiner—Kenneth H. Betts
Assistant Examiner—John A. Pekar
Attorney, Agent, or Firm—Jack E. Toliver

[57] ABSTRACT

A steering control system for articulated vehicles employing hydraulically operated steering jacks. A steering control device, such as an open-center valve, supplies fluid to the jacks such that one is extended and the other retracted in response to the displacement of the valve spool causing one vehicle section to pivot relative to the other. Specifically, a steering control system is provided in which a drag link connects the pitman arm of the steering gear on the front vehicle section with a steering control lever pivotally mounted on the rear vehicle section. A steering adjustment is provided by connecting the link at one of several steering sensitivity positions on the lever.

7 Claims, 11 Drawing Figures

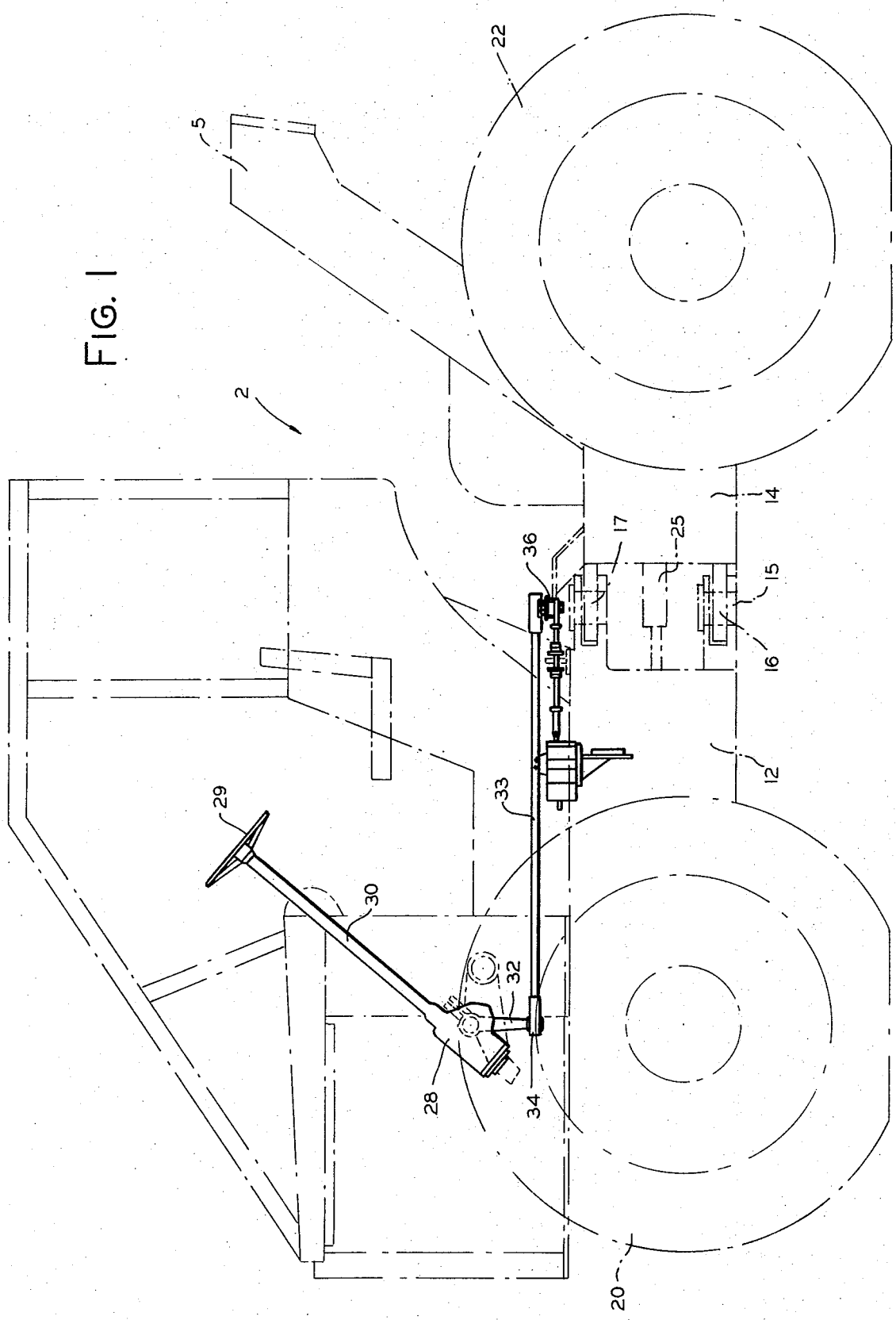

ADJUSTABLE RATIO STEERING CONTROL FOR ARTICULATED VEHICLE

BACKGROUND OF THE INVENTION

The invention pertains to the art of articulated steering controls for vehicles having front and rear frame sections pivotally joined for turning movement about a generally upright steering axis between the two frame sections.

DESCRIPTION OF THE PRIOR ART

Articulated vehicle steering systems are known in which a pair of levers, one parallel to the other, are interconnected to permit the levers to swivel relative to each other on a pivot pin. The pin can be inserted between one of several spaced pairs of apertures in the two levers. The pivotal movement of one lever is controlled by the steering wheel on the front vehicle section. This lever moves the other lever which controls a steering valve, or other steering control device, mounted on the rear vehicle section. The ratio of movement between the two levers can be varied according to in which pair of apertures the pivot pin is located. The effect of the change in ratios is to cause the operator to move the steering wheel a lesser or greater amount to bring about the required steering movement. For example, a small amount of steering wheel movement may be desirable in situations where frequent turns are required over a short distance and at low speeds. This would be a high sensitivity of steering response produced by inserting the pin at a location which would magnify the relative movement of the two levers. On the other hand, where the vehicle is operating in open areas requiring fewer turns, the number of steering wheel revolutions required to effect the same turning motion of the vehicle sections would be increased for a lower steering sensitivity by changing the pin location to decrease the relative movements of the lever. The latter condition would provide the operator with greater control in open terrain where quick steering response is less important.

SUMMARY OF THE INVENTION

In the invention, an articulated vehicle having a front frame section and a rear frame section pivotally joined together is steered by a pair of steering jacks, one on each side of the steering axis. A manual steering device, such as a steering wheel, is located on the front section. An hydraulic steering control device, such as an open-center valve having a shiftable valve spool, is also mounted on the front section. The valve spool is movable in either direction from a neutral position in response to right to left steering commands received from the steering wheel. Hydraulic fluid under pressure is directed by the valve to the appropriate ends of the steering jacks causing one to extend and the other to retract by an amount proportional to the volume of hydraulic fluid supplied to the jacks which in turn is proportional to the displacement of the valve spool. An adjustable ratio steering control system is provided including a steering control lever pivotally mounted on the rear frame section with its free end over the steering axis in the neutral position of the valve. The steering response or sensitivity is adjusted by changing the position at which the steering commands are received by the steering control lever.

More specifically, a drag link connects the pitman arm of the steering wheel gear box to the steering control lever. A connecting rod at the free end of the lever connects with the valve spool of the open-center valve. By changing the connection pivot of the drag link on the steering control lever, the sensitivity may be changed to suit the driving conditions.

For instance, it may be desirable to have the steering response less sensitive to the steering commands of the steering wheel. In this case the drag link will be connected to the steering control lever at a point farthest from the steering axis between the two vehicle sections. In this case the magnitude of the steering commands required to produce a corresponding steering response is increased for low sensitivity, i.e., more turns of the wheel are required. A connection closer to the steering axis however, will require fewer turns of the wheel to achieve the same steering response, of high steering sensitivity.

Follow-up is automatic. The steering commands are cancelled as the front and rear frame sections articulate. This occurs because the body of the open-center valve is mounted on the front frame section and the valve spool is connected to the steering control lever on the rear frame section. As the frame sections turn relative to one another, the valve spool is returned to its neutral position automatically.

A log skidder is one type of articulated vehicle on which the invention is utilized most advantageously. It is common for log skidders to operate in wooded areas where trees and limbs are prone to fall or catch between the vehicle sections. One of the main advantages of the invention over the prior art is the use of a single steering control lever. In the prior art system described above, where parallel levers are used, there is a greater chance of jamming or of false steering signals being transmitted than where a single lever is employed. This is especially true in log skidders where tree branches or even felled trees may strike the steering linkage or tend to lodge in it inhibiting the steering control function.

In addition, the steering system according to the present invention permits the hydraulic steering control valve, or other device, to be located on the front vehicle section. For vehicles such as log skidders having the engine mounted on the front section, this locates the steering valve relatively close to the hydraulic pump driven by the engine which is supplying the hydraulic pressure for operating the steering jacks. This means that hydraulic lines may be shortened or even that the pump and steering valve may be integrated into a single casting eliminating some hydraulic lines. This decreases the vulnerability to damage or failure due to rupture of a hydraulic hose which is particularly important in remote logging operations where maintenance is difficult.

These and other advantages will be more apparent by referring to the following detailed description of the invention which proceeds with a description of the drawings wherein:

FIG. 1 is a side elevational view of a log skidder vehicle having front and rear frame sections pivotally joined on a vertical steering axis between the two sections, the vehicle being outlined in dot-dash lines and the adjustable ratio steering system according to the present invention, being shown in full lines;

FIGS. 4a–4e inclusive depicting the operation of the control; and

Figure 4A:
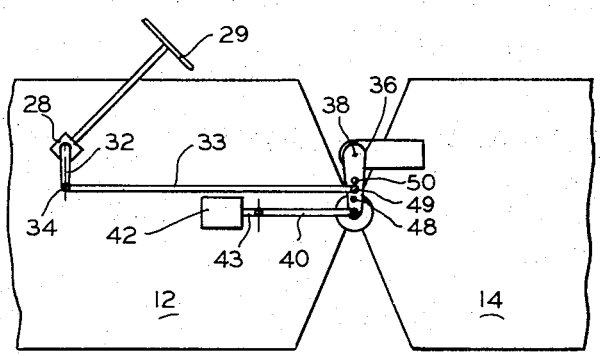
Figure 4B:
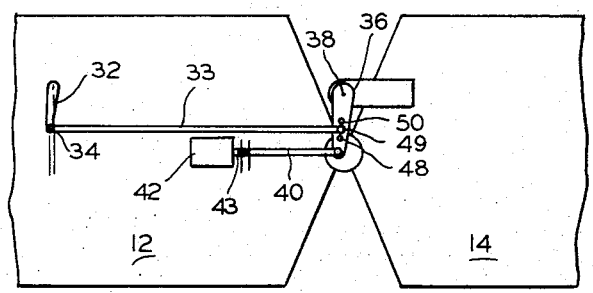
Figure 4C:
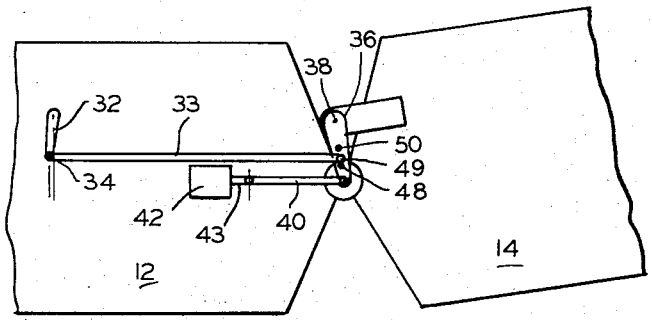
Figure 4D:
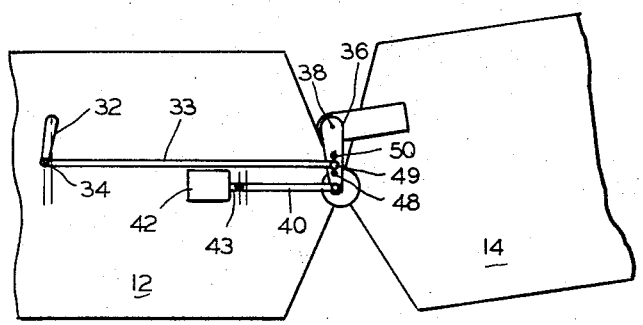
Figure 4E:
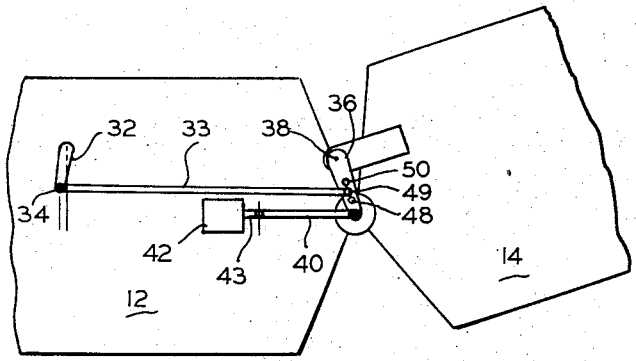
Figure 4F:
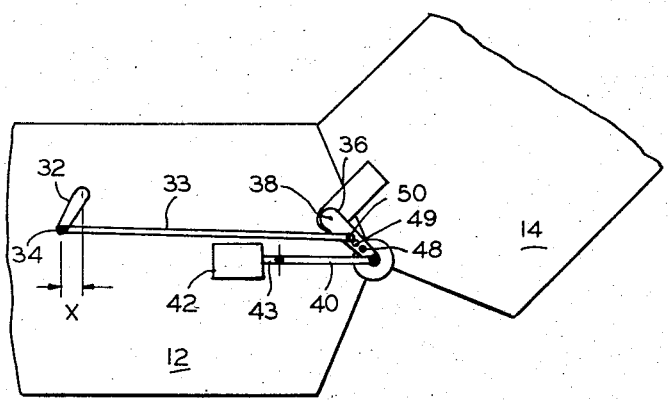
Figure 4G:
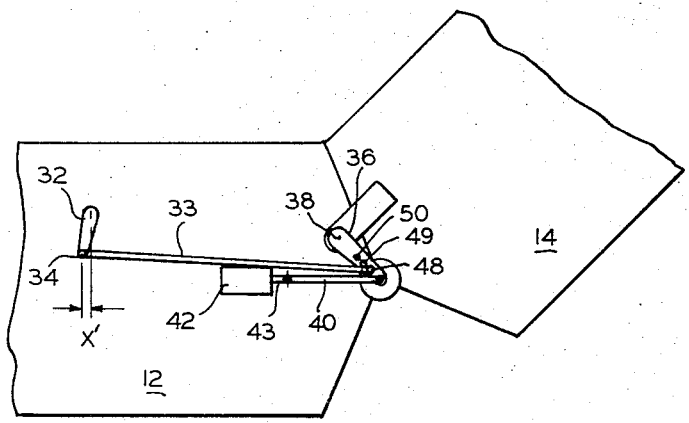
Figure 4H:
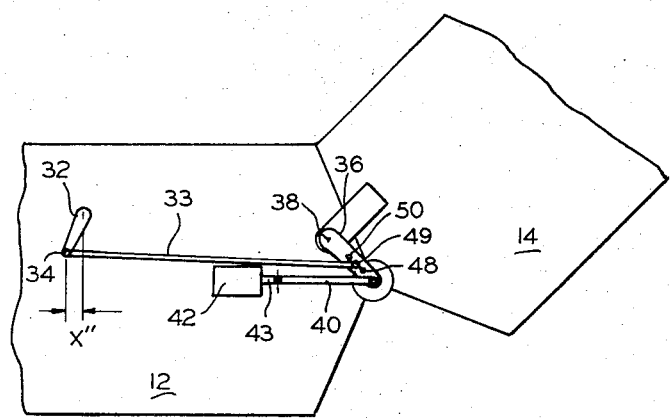

FIGS. 4f, 4g, 4h showing the effects of three sensitivity adjustments providing a given turning movement.

DETAILED DESCRIPTION OF THE PREFERRED EMBODIMENT

FIG. 1 shows a four-wheeled drive, articulated log skidder vehicle 2 having a boom 5 from which logs are lifted at one end and dragged or skidded by driving the vehicle forwardly. The skidder vehicle 2 includes a front frame section 12 articulated to a rear frame section 14 about a substantially vertical axis 15 between the two sections as defined by the pivotal connections at 16 and 17. The front frame section 12 is supported by a pair of wheels 20 and the rear section 14 by a pair of wheels 22. An engine (not shown) is mounted on the front frame section for driving the wheels 20, 22 and also for powering other components of the machine.

The Steering Jacks

The skidder vehicle 2 is steered by pivoting one frame section relative to the other about the vertical steering axis defined by the pivotal connections 16, 17. A pair of hydraulically actuated, double-acting, steering jacks 25, 26, one on each side of the steering axis is pivotally connected between the front and rear frame sections 12, 14. The steering jacks 25, 26 (FIG. 2) are hydraulically cross-coupled so as to be actuated by the steering control system to extend on one side and retract on the other causing the vehicle frame sections to pivot.

The Steering Control System

Figure 3:
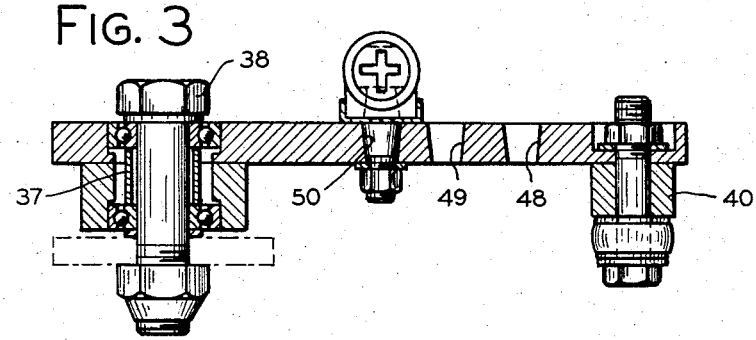
FIG. 3 is a sectional view showing the pivotal mounting of the steering control lever and the low, intermediate and high sensitivity adjustments therewith.
Figure 2:
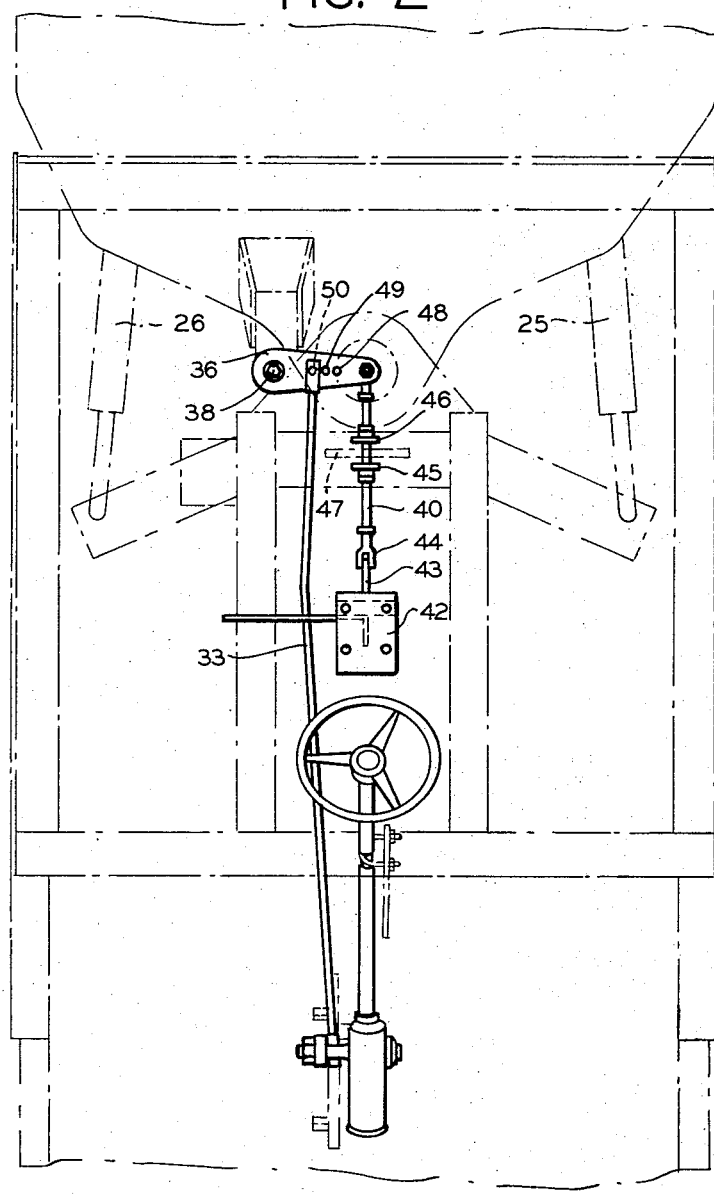
FIG. 2 is a fragmentary plan view of the log skidder vehicle shown in FIG. 1 viewing the steering system from above.

The steering control system comprises a steering gear 28 on the front vehicle section operated by a steering wheel 29 which is connected through the steering column 30 to the steering gear 28. The steering gear 28 has a pitman arc 32 which swings in an arc generally parallel to the longitudinal axis of the vehicle in response to turning movements of the steering wheel 29. In the position shown in FIG. 1 the pitman arm 32 is disposed in the position at which the vehicle would be steered straight ahead and it will be understood that by turning the steering wheel 29 in one direction or the other the pitman arm 32 will be swung forwardly or backwardly from the position shown. A drag link 33 is connected by a ball joint 34 to the free end of the pitman arm 32. The drag link 33 extends rearwardly from the front frame section to the rear frame section and connects at its trailing end to a steering control lever 36 (FIG. 2). The lever 36 is pivotally mounted on a bearing 37 carried on a pin 38 secured to the rear frame section (FIG. 3). The lever 36 is free to pivot on the pin 38 in response to longitudinal movements of the drag link 33 transmitting the steering commands from the steering wheel 29, gear 28 and pitman arm 32. A connecting rod 40 is pivotally connected to the outer end of the lever 36. The rod extends forwardly for connection with an hydraulic steering valve 42 mounted on the front frame section. The steering valve may be an open-center valve as depicted in the drawings having a valve spool 43 connected by a clevis 44 to the rod 40. It will be understood that with the open-center valve, the steering jacks 25, 26 will be cross-coupled hydraulically through and the valve and the valve body will be ported in such a way that movement on the valve spool 43 in either direction from a neutral position will connect appropriate hydraulic lines leading from the steering jacks to a source of hydraulic pressure such as a pump driven by the engine. The steering jack on one side is extended and the one on the opposite side is retracted by an amount proportional to the volume of hydraulic fluid permitted to flow through the valve before the valve spool is returned to the neutral or open-center position. This position corresponds to the position where the jacks are hydraulically locked and the hydraulic fluid from the pump is vented. The rod 40 has a pair of stops 45, 46 on either side of an aperture plate 47 on the frame through which the rod 40 extends. The stops act to limit travel of the rod 40 consistent with the maximum steering angle of the skidder.

Of course, in place of the open-center valve, a variable displacement, hydrostatic pump may be used. Such pumps are characterized by a series of revolving pistons and a swash plate. The swash plate may be inclined in either direction from a neutral mode position to cause fluid pumping. The amount of inclination controls the pump displacement. The connecting rod 40 would be connected to the swash plate. The neutral position of the swash plate would correspond to the open-center position of the valve spool 43 in the preferred embodiment and be tilted in one direction or the other for right and left steering commands.

Sensitivity Adjustment

In accordance with the preferred embodiment of the invention, the lever 36 is provided with a plurality of spaced apertures 48, 49 and 50 (FIG. 3) in which the drag link 33 may be connected. The openings 48, 49 and 50 are arranged in a row on an axis extending transversely through the pivot axis of the lever 36 and the pivotal connection at the free end with the rod 40, the later substantially coincident with the vertical steering axis 15 between the front and rear frame sections when the valve spool 43 is in the open-center position. The apertures 48, 49, 50 provide means for adjusting the sensitivity of the steering command. That is, when the drag link is connected in the opening 50 closest to the pivot axis of the steering control lever, or farthest from the steering axis 15, the steering commands become less sensitive than would be the case if the drag link 33 were connected in the opening 48 nearest steering axis. An intermediate sensitivity adjustment is provided by the opening 49.

This may be visualized by assuming perfect valve sensitivity and unrestricted hydraulic flow, thus cutting the lag time to zero. In that ideal case, the steering control would perform as if the steering lever 36 were mounted rigidly to the rear frame and pivoted about the steering axis. With the drag link connected in opening 50 closest to the steering control lever pivot (FIG. 4f), a greater number of turns of the steering wheel will be required to produce a given turning movement of the frame sections as represented by the distance $x$. On the other hand, connection of the drag link 33 in the opening 48 (FIG. 4g) nearest the steering axis requires fewer turns of the steering wheel in order to bring about the same turn as depicted by the distance $x'$. Similarly, the opening 49 (FIG. 4h) will correspond to an intermediate displacement of the steering wheel $x''$.

Instead of apertures, a slot and slidable connection may be used for the line 33, it being understood that this and other variations may be devised without departing from the principle of the invention as embodied in the preferred arrangement shown in the drawings.

Steering Follow-Up

In response to the steering commands, the valve spool 43 will be displaced in one direction or the other from its open-center or neutral position such that certain valve ports in the valve body will be uncovered by the valve spool permitting hydraulic fluid to be delivered under pressure to the steering jacks causing them to extend and retract. The steering control lever will have been pivoted either forwardly or rearwardly from the position shown in FIG. 2, depending upon the direction of movement of the drag link 33. With the valve body stationary on the front frame section, the lever 36 now pivots about the connection of the link 33 as relative movement between the frame section occurs. This automatically cancels out the steering command as the valve element 43 is returned to its neutral position.

Operation

The steering system of a vehicle engaged in logging operations must be protected from damage by collision with felled trees or from being jammed by branches. The steering control system according to the invention is considered particularly able to meet the requirements of logging operations because of the direct acting nature of the linkage which is inherently less subject to jamming.

Considering the steering position at which the vehicle sections are aligned for straight ahead travel as shown in FIG. 4a the steering system will be in a condition such that the position of the lever 36 is as shown with its free end positioned approximately over the vertical steering axis between the frame sections. In this position the valve spool 43 is in the open-center or neutral position, or in the case of a variable displacement pump, the swash plate is in the neutral position, such that the steering jacks are locked. It may be assumed that the drag link is connected in the aperture 49 such that longitudinal movement of the link 33 in response to rotation of the steering wheel for a right-hand turn (clockwise as viewed in FIG. 2) will rotate the lever 36 forwardly or clockwise about the pin 38 (FIG. 4b). This movement will be transmitted to the rod 40. The rod 40 will be pushed forwardly displacing the valve spool 43 from its open-center position so that hydraulic fluid under pressure is immediately directed to the appropriate ends of the steering jacks 25, 26 causing the rear frame section to instantly rotate about the steering axis (FIG. 4c). The pin 38 fixed to the rear frame section also rotates about the steering axis pivoting the lever 36 about the connection 49 and moving the free end back over the steering axis (FIG. 4c). The lever 36 now is idle. In this position, the ports in the valve body are closed as the steering movement is completed, thus cancelling out the steering command.

It is important to note that each successive movement of the steering wheel (FIGS. 4b-c and FIGS. 4d-e) rotates the steering lever 36 farther about the steering axis (FIG. 4c, 4e, 4h) causing the steering lever 36 to pivot about the sensitivity adjustment connection 48, 49, 50 and shift the valve spool back to neutral. The response is so rapid that the steering effect is as if the lever 36 were actually pivoted over the steering axis and was solidly connected to the rear frame section and was being pulled physically by the drag link 33. If it is desired to decrease the sensitivity of the steering commands, such as where the skidder might be operating in relatively open terrain requiring fewer turns, the drag link 33 may be disconnected from the higher sensitivity opening 48 and placed in one of the lower sensitivity positions, such as opening 50 or the intermediate position at 49. In these positions a greater number of turns of the steering will be required in order to bring about the same turning motion that was produced with the drag link connected in the opening 48.

For example, if it takes two full steering wheel movements to complete a full turn in opening 48, (FIG. 4g) three in opening 49 (FIG. 4h) and four in opening 50 (FIG. 4f); the increments of valve spool movement must be least in opening 48, longer in opening 49 and longest in opening 50 to correspond with the increments of steering wheel movement required for a given turn.

For a left turn, the lever 36 is pivoted rearwardly displacing the valve spool 43 in the opposite direction from its open-center position causing the retraction of the jack 25 on one side and the extension of the jack 26 on the opposite side. The follow-up system operates as described above only in the opposite direction.

While only a single preferred embodiment of our invention has been disclosed, it will be understood that this description is for purposes of illustration only and that various modifications and changes can be made to my invention without departing from the spirit and scope of it. Therefore, the limits of our invention should be determined from the following appended claims.

We claim:

1. In an articulated vehicle having a front frame section, a rear frame section pivotally connected to the front frame section on a vertical steering axis between the two sections about which one section turns relative to the other, a pair of steering jacks, one on each side of the steering axis extending between the front and rear frame sections being fluid operable to extend and retract to cause turning movements of the frame sections, and a manual steering device located on the front frame section operable to impart steering commands for controlling the steering jacks, the improvement comprising an adjustable ratio steering control system including a single steering control lever pivotally mounted on the rear frame section on a vertical axis offset laterally with respect to the steering axis, first means fluid coupling the steering jacks mounted on the front frame section having movable fluid control means operable from a neutral position at which the steering jacks are held at relatively equal extensions for straight ahead steering of the vehicle sections to positions displaced from said neutral position for supplying fluid under pressure to the steering jacks causing one to extend and the other retract proportionately to the magnitude of said steering commands, second means connecting the manual steering device and steering control lever for transmitting said steering commands to the latter, third means connected between said steering control lever and said movable fluid control means and steering sensitivity adjustment means on said steering control lever adjustable to various positions at which steering commands are received by the steering control lever increasing in sensitivity as the radial distance increases from the pivot axis of said lever.

2. The improvement according to claim 1 wherein said second means is a link element movable longitudinally an amount proportional to said steering commands and said third means comprising a connecting rod pivotally connected at one end adjacent the free end of said steering control lever approximately coinciding with the steering axis between the front and rear frame sections at the neutral position of said movable fluid control means.

3. The improvement according to claim 2 wherein said sensitivity adjustment means comprises a plurality of apertures spaced radially along a line intersecting the pivot axis of said steering control lever and the connection with said third means, the aperture nearest said pivot axis providing the lowest sensitivity adjustment while the aperture nearest said connection providing the highest sensitivity adjustment.

4. The improvement according to claim 2 wherein automatic follow-up is provided by the steering control lever remaining stationary with said movable fluid control means which is thereby automatically returned to the neutral position upon relative turning movement of the front and rear frame sections.

5. In an articulated vehicle having a front frame section, a rear frame section pivotally connected to the front frame section on a vertical steering axis between the two sections about which one section turns relative to the other, a pair of steering jacks, one on each side of the steering axis extending between the front and rear frame sections being fluid operable to extend and retract to cause turning movements of the frame sections, and a manual steering device located on the front frame section operable to impart steering commands for controlling the steering jacks, the improvement comprising an adjustable ratio steering control system including a steering control lever pivotally mounted on the rear frame section on a vertical axis offset laterally with respect to the steering axis, a steering valve hydraulically coupling the steering jacks mounted on the front frame sections having a valve spool axially movable along the longitudinal axis generally in the plane of said steering control lever from a neutral position at which the steering jacks are held at relatively equal extensions for straight ahead steering of the vehicle sections to positions displaced from said neutral position for supplying fluid under pressure to the steering jacks causing one to extend and the other retract proportionately to the magnitude of said steering commands, a drag link connecting the manual steering device and steering control lever for transmitting said steering commands to the latter along a longitudinal axis generally in the plane of said steering control lever having a pivotal connection on the lever intermediate the steering axis and the axis of movement of said valve spool and steering sensitivity adjustment means for varying the radial position of said pivotal connection relative to the steering axis.

6. The improvment according to claim 5 wherein the axis of movement of the valve spool passes through the vertical steering axis.

7. The improvement according to claim 6 wherein a connecting rod extends between the end of the valve spool and end of the steering lever operable upon articulation of the rear vehicle section about the steering axis when said steering control lever is stationary for returning said valve spool to the neutral position.

* * * * *